455-296 SR 33 REFERENCE SEARCH ROOM
FIP8106 XR 2,736,769
X5432E
Feb. 28, 1956 A. MACOVSKI 2,736,769
NOISE CUT-OFF SYNCHRONIZING SIGNAL SEPARATOR
Filed Sept. 19, 1952
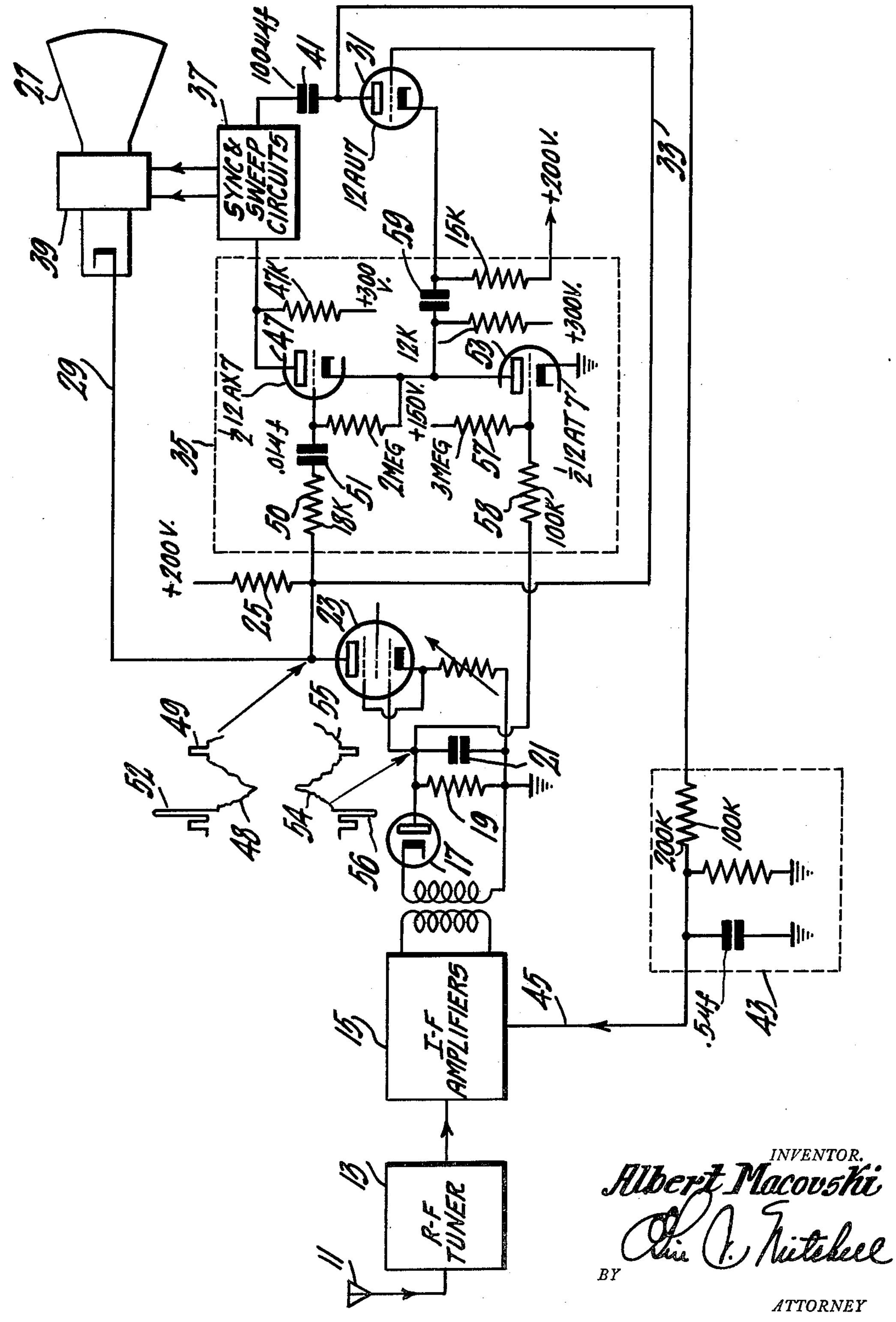
INVENTOR.
Albert Macovski
BY [signature]
ATTORNEY
2736769
OR IN 358/155

2,736,769
Patented Feb. 28, 1956

2,736,769

NOISE CUT-OFF SYNCHRONIZING SIGNAL SEPARATOR

Albert Macovski, New York, N. Y., assignor to Radio Corporation of America, a corporation of Delaware Application September 19, 1952, Serial No. 310,395

3 Claims. (Cl. 178—7.3)

This invention relates to noise immunity of television receivers and the like. More particularly, it relates to the noise immunity of the synchronizing signal separator and automatic gain control (AGC) circuit of such receivers.

Where television signals are transmitted with negative modulation, as they are in the United States, the most objectionable effect of noise pulses is to cause the receiver to drop out of synchronism. This occurs because the noise pulses are in the same direction as the synchronizing pulses and may look like synchronizing pulses to the synchronizing circuit of the receiver.

It has been proposed heretofore to block the synchronizing amplifier for the duration of a noise pulse so that the deflecting circuit oscillator will not have a false "synchronizing" pulse applied thereto. The absence of one or two synchronizing pulses caused by this blocking of the amplifier channel is not serious, since the deflecting circuit oscillator is free-running at a frequency close to the desired deflecting frequency. One such proposal may be found in U. S. Patent 2,299,333 issued to C. C. Martinelli on October 20, 1942.

It is an object of this invention to improve the noise immunity of television receivers and the like.

It is a further object of this invention to provide a simple and economical circuit to render the synchronizing and AGC circuits of a television receiver immune to noise impulses.

According to the illustrated embodiment of the present invention, a unilateral conduction device is placed in series with the synchronizing signal separator, so that the current flowing in the synchronizing signal separator flows through the unilateral conduction device. Demodulated television signals are applied to the unilateral conduction device which is biased so that it is conductive when the signals applied thereto are free from noise; and cut off when noise pulses which extend beyond the potential level of the synchronizing component of the signal are applied thereto. When the unilateral conduction device is cut off, it prevents current from flowing in the synchronizing signal separator which thus gets cut off.

Other and incidental objects of the present invention will be apparent to those skilled in the art from a reading of the specification and inspection of the accompanying drawing, which shows an embodiment of the present invention applied to the television receiver.

Referring to the drawing, there is shown an antenna 11, an R. F. (radio frequency) tuner 13, and a chain of I. F. (intermediate frequency) amplifiers 15. The output of the chain of I. F. amplifiers 15 is demodulated by the detector comprising diode 17, resistor 19, and capacitor 21. The output of the detector is applied to a video amplifier which comprises tube 23 and load resistor 25. The output of the video amplifier tube 23 is applied to the cathode of the kinescope 27 over lead 29, to the control grid of the automatic gain control (AGC) tube 31 over lead 33, and to the synchronizing signal separator enclosed in box 35. The output of the synchronizing signal separator 35 is applied to the sync and sweep circuits 37 to obtain deflection voltages which are fed to the yoke 39 of the kinescope 27. Pulses which may be derived from the horizontal output transformer included in the sync and sweep circuits 37 are applied through capacitor 41 to the anode of the AGC tube 31. A potential depending on the strength of the signal applied to the grid of tube 31 is obtained at the anode of that tube, suitably filtered through AGC filter 43 and applied by means of lead 45 to the I. F. amplifiers 15 to control the gain thereof. The circuits described or mentioned thus far are conventional and well known to those skilled in the art.

The circuit according to the present invention is included in box 35. It includes triode section 47 which is a synchronizing signal separator tube. Video signals 48 with the synchronizing pulses 49 going in a positive direction, are applied to the control grid of triode section 47 through resistor 50 and capacitor 51. Noise pulses 52 extend in a positive direction beyond the synchronizing pulses. The triode section 47 is biased so that it will conduct only during the occurrence of the synchronizing pulses. A unilateral conduction device 53 is connected in series with the triode section 47 so that the grid and plate current of triode section 47 flow through the unilateral conduction device 53. The output signal 54 of the detector 17 is applied to the control grid of the unilateral conduction device 53 with the sync pulses 55 and noise 56 going in a negative direction. Resistors 57, 58, and 19 form a voltage divider so that the bias on the unilateral conduction device 53 is such that it will conduct when signals free of noise are applied thereto, and be cut off in the presence of noise pulses 56. When the unilateral conduction device 53 is cut off by noise pulses, no current flows through triode section 47, thus rendering the synchronizing signal separator immune to noise.

When the unilateral conduction device 53 is cut off by noise pulses, a positive pulse appears at the anode of that device. According to one feature of the present invention, this positive pulse is coupled to the cathode of the AGC tube 31 through coupling capacitor 59 rendering the AGC tube immune to noise by cutting it off in the presence of noise pulses. This A.-C. coupling through capacitor 59 allows only fast potential charges such as noise pulses to reach the cathode of the AGC tube 31. The cathode of the AGC tube 31 will not be affected by slow charges of potential at the anode of the unilateral conduction device 53 such as may be caused by variations in signal strength. Thus, the condition known as "lockout" is prevented from occurring.

What is claimed is:

1. A noise immune television synchronizing signal separator circuit for use in a television receiver adapted to receive and demodulate signals of the standard television type, said signals including a synchronizing signal component comprising pulses extending from the blanking level of the television signal and having a peak amplitude which extends in excess of any other intelligence component of said television type signals, comprising in combination: a source of demodulated signals of the type described; a synchronizing signal separator circuit comprising a synchronizing separator electron discharge tube having operating electrodes corresponding to a cathode, a control electrode and an anode, said separator circuit including power supply means operatively connected with said operating electrodes; means operatively applying television signals from said source to the control electrode of said synchronizing signal separator tube with such polarity that the synchronizing signal component thereof is in a direction to increase conduction in said synchronizing separator tube; bias means operatively connected with the control electrode and cathode of said separator tube imposing a cutoff bias thereon of a value maintaining anode current cutoff in said separator tube except for signals applied to said control electrode exceeding the blanking level of said television signal; a noise inverter tube having a cathode, a control electrode and an anode; a connection means placing said noise inverter tube in direct current conducting series connection with said separator tube such that the cathode of said synchronizing signal separator tube and the anode of said noise inverter tube are substantially directly joined whereby non-conduction in said noise inverter tube will discontinue anode current flow in said separator tube; means applying demodulated television signals between the cathode and control electrode of said noise inverter tube in driving relation thereto with such polarity that noise extending in the direction of television synchronizing pulses tends to reduce conduction in said noise inverter tube; means biasing said noise inverter tube so that it is conductive for signal excursions corresponding to television signal excursions drivingly applied thereto but is non-conductive upon the occurrence of noise pulses extending in amplitude beyond the peak amplitude of said synchronizing signal pulse component such that current in said synchronizing separator tube anode is discontinued upon the occurrence of noise pulses; and means including a load circuit connected in anode current conducting relation to the anode of said synchronizing signal separator tube for extracting noise free synchronizing pulses.

2. In a television receiver the combination of: a circuit ground signal reference means; means producing demodulated television signals having a direct current component and a synchronizing pulse component comprising pulses extending from the blanking level of said television signals and of an amplitude in excess of the amplitude of all other components in said signals, said signal producing means including means making available demodulated signal of a positive going synchronizing pulse polarity as well as demodulated signal of a negative going synchronizing pulse polarity relative to said circuit ground means; a first and a second amplifier device each having electrodes corresponding to a vacuum tube cathode, anode and control electrode; a direct current connection between said first device cathode and said second device anode placing said first and second amplifying devices in series with one another; direct current connection means connecting said second device cathode with circuit ground; positive potential power supply means referenced to circuit ground; a resistor connected between said first device anode and said positive power supply means to form an output signal load current for said first device; separate input resistance means respectively connected in a direct current conductive fashion between the control electrodes and cathodes of said first and second devices; a capacitor connected between said signal producing means and said first device control electrode such as to couple thereto video signal of positive going synchronizing pulse polarity such that control electrode current is established by successive synchronizing pulses with the values of said first device input resistance means and associated coupling capacitor forming a time constant biasing network for said first device such that anode current in said first device is established only by signal excursions in excess of said blanking level; a direct current video signal coupling means connected between said signal producing means and said second device control electrode coupling thereto video signal of a negative going synchronizing pulse polarity; and bias means connected to said second device control electrode establishing bias of a value causing signal excursions in excess of synchronizing pulse peaks to establish non-conduction in said second device and thereby interrupt anode current flow in said first device.

3. In a television receiver the combination of: a circuit ground signal reference means; means producing demodulated television signals having a direct current component and a synchronizing pulse component comprising pulses extending from the blanking level of said television signals and of an amplitude in excess of the amplitude of all other components in said signals, said signal producing means including means making available demodulated signal of a positive going synchronizing pulse polarity as well as demodulated signal of a negative going synchronizing pulse polarity relative to said circuit ground means; a first and a second amplifier device each having electrodes corresponding to a vacuum tube cathode, anode and control electrode; a direct current connection between said first device cathode and said second device anode placing said first and second amplifying devices in series with one another; direct current connection means connecting said second device cathode with circuit ground; positive potential power supply means referenced to circuit ground; a first resistor connected between said first device anode and said positive power supply means to form an output signal load circuit for said first device; a second resistor connected between said second device anode and said positive power supply means for operatively polarizing said second device anode; separate input resistance means respectively connected in a direct current conductive fashion between the control electrodes and cathodes of said first and second devices; a capacitor connected between said signal producing means and said first device control electrode such as to couple thereto video signal of positive going synchronizing pulse polarity such that control electrode current is established by successive synchronizing pulses with the values of said first device input resistance means and associated coupling capacitor forming a time constant biasing network for said first device such that anode current in said first device is established only by signal excursions in excess of said blanking level; a direct current video signal coupling means connected between said signal producing means and said second device control electrode coupling thereto video signal of a negative going synchronizing pulse polarity; bias means connected to said second device control electrode establishing bias of a value causing signal excursions in excess of synchronizing pulse peaks to establish non-conduction in said second device and thereby interrupt anode current flow in said first device; an automatic gain control circuit having a third amplifier device including an anode, cathode and control electrode, output load gain control voltage developing means connected between said anode and said cathode of said third device including a resistor connected between said third device anode and said positive power supply means; a direct current connection from said signal producing means and said third device control electrode applying thereto video signal including a direct current component; and a capacitor connected from said second device anode and said third device cathode.

References Cited in the file of this patent

UNITED STATES PATENTS

| | | |
|---|---|---|
| 2,028,859 | Barton | Jan. 28, 1936 |
| 2,151,774 | Koch | Mar. 28, 1939 |